US010352621B2

(12) United States Patent
O'Brien (10) Patent No.: US 10,352,621 B2
(45) Date of Patent: Jul. 16, 2019

(54) DUAL AXIAL FAN WITH A THERMAL EXCHANGE COMPONENT FOR A VEHICLE

(71) Applicant: TSI Products, Inc., Arlington, TX (US)

(72) Inventor: Stephen William O'Brien, Fort Worth, TX (US)

(73) Assignee: TSI Products, Inc., Arlington, TX (US)

( * ) Notice: Subject to any disclaimer, the term of this patent is extended or adjusted under 35 U.S.C. 154(b) by 228 days.

(21) Appl. No.: 14/846,427

(22) Filed: Sep. 4, 2015

(65) Prior Publication Data

US 2017/0067698 A1    Mar. 9, 2017

(51) Int. Cl.

| F28D 1/02 | (2006.01) |
|---|---|
| B60H 1/00 | (2006.01) |
| F24F 7/06 | (2006.01) |
| F04D 25/16 | (2006.01) |
| F24F 1/0033 | (2019.01) |

(52) U.S. Cl.
CPC ......... *F28D 1/024* (2013.01); *B60H 1/00464* (2013.01); *F04D 25/166* (2013.01); *F24F 1/0033* (2013.01); *F24F 7/065* (2013.01)

(58) Field of Classification Search
CPC .. F04D 25/166; B60H 1/00464; F24F 1/0033; F24F 7/065; F28D 1/024
USPC ............... 165/42, 121, 127; 62/429; 415/66; 454/40
See application file for complete search history.

(56) References Cited

U.S. PATENT DOCUMENTS

| 2,169,693 | A | * | 8/1939 | Haynes ................. B60H 1/3227 165/125 |
| 4,690,209 | A | * | 9/1987 | Martin ..................... F25B 39/02 165/135 |
| 6,068,046 | A | * | 5/2000 | Pommier ........... B60H 1/00207 165/41 |
| 7,159,651 | B2 | * | 1/2007 | Ito ....................... B60H 1/00007 165/202 |
| 2006/0179871 | A1 | * | 8/2006 | Wagner .............. B60H 1/00407 62/419 |
| 2007/0081888 | A1 | * | 4/2007 | Harrison ............... F04D 19/007 415/47 |
| 2008/0110185 | A1 | * | 5/2008 | Veettil .................. B60H 1/3226 62/115 |
| 2011/0308266 | A1 | * | 12/2011 | Lafleur ................. F24F 1/0014 62/186 |
| 2012/0011869 | A1 | * | 1/2012 | Kondo ................. B60H 1/2225 62/176.5 |
| 2012/0090814 | A1 | * | 4/2012 | Crosier ............. B60H 1/00028 165/59 |

FOREIGN PATENT DOCUMENTS

WO    WO 2005050026 A1 *  6/2005    ........... F04D 25/166

* cited by examiner

*Primary Examiner* — Paul Alvare
(74) *Attorney, Agent, or Firm* — Hitchcock Evert LLP (57) ABSTRACT

A dual fan apparatus for providing heated or cooled air which is compact fit within limited spaces. The dual fan apparatus includes two axial fans on opposing sides of a thermal exchange component which operate in coordination to move air in one direction at a time through the apparatus. The dual fan apparatus increases airflow and thermal transfer efficiency through the thermal exchange component.

27 Claims, 6 Drawing Sheets

DUAL AXIAL FAN WITH A THERMAL EXCHANGE COMPONENT FOR A VEHICLE

FIELD OF THE DISCLOSURE

The invention relates generally to the field of vehicle heating and air conditioning systems.

BACKGROUND

Heater and air conditioning systems are common in many automobiles and have been incorporated into other types of vehicles. Vehicle heaters use a fan blowing air across a heater core or heat source and to the passenger. Vehicle air conditioning systems use a fan blowing air across an evaporator and to the passenger. The size of the heating and air conditioning systems is often dictated by the space restrictions within the given vehicle.

SUMMARY

The present disclosure provides an apparatus for improved heating and/or air conditioning a vehicle. The apparatus increases the heating and/or cooling effectiveness while maintaining a compact design that allows for the apparatus to be used within the limited space available in vehicles such as small automobiles, all-terrain vehicles (ATVs), boats, snow mobiles, tractors, trailers, farm equipment, motorcycles, golf carts, etc. While the apparatus is discussed in the context of vehicles, the apparatus may also be used in other environments such as stationary equipment and containers.

Embodiments of the apparatus use a dual fan configuration to improve the heat transfer within the same limited space available for the thermal exchange component and increase the velocity of air passing through the thermal exchange component. One fan is located on the first side of the thermal exchange component and the other fan is located on the second side of the thermal exchange component. The two fans operate in conjunction to maximize the temperature transfer occurring as the air passes through the thermal exchange component. A first fan operates to pull air from the ambient and push air into the thermal exchange component while the second fan operates to pull the temperature modified air from the thermal exchange component and push the temperature modified air out of a vent.

Some embodiments of the apparatus implement axial fans having a central motor which rotates the fan blades around the central axis of the motor. During operation the fans counter rotate to create a push-pull effect through the thermal exchange component.

Embodiments of the present disclosure include air ducts for the ingress and egress of air on the opposite side of each fan from the thermal exchange component. Some embodiments of the air ducts include ports with a vent or other faceplate. Some embodiments of the air ducts include multiple ports each with a vent or other faceplate. In some embodiments, the vent or faceplate is designed to direct the flow of air through the port. Embodiments of the vent or faceplate may be designed to prevent occlusion of the port.

Embodiments of the thermal exchange component may include a heating element (such as a heat exchanger, electric coil, heater core, etc.), a cooling element (such as an air conditioner evaporator) or a combination component comprising a heating element and a cooling element.

A BRIEF DESCRIPTION OF THE DRAWINGS

Embodiments will now be described, by way of example only, with references to the accompanying drawings in which.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. As used herein, the terms "and", "or" and "and/or" may be used interchangeably. It will be understood that the invention may be embodied in other specific forms without departing from the spirit or central characteristics thereof. The present embodiments, therefore, are to be considered in all respects as illustrative and not restrictive, and the invention is not to be limited to the details given herein.

Figure 1:
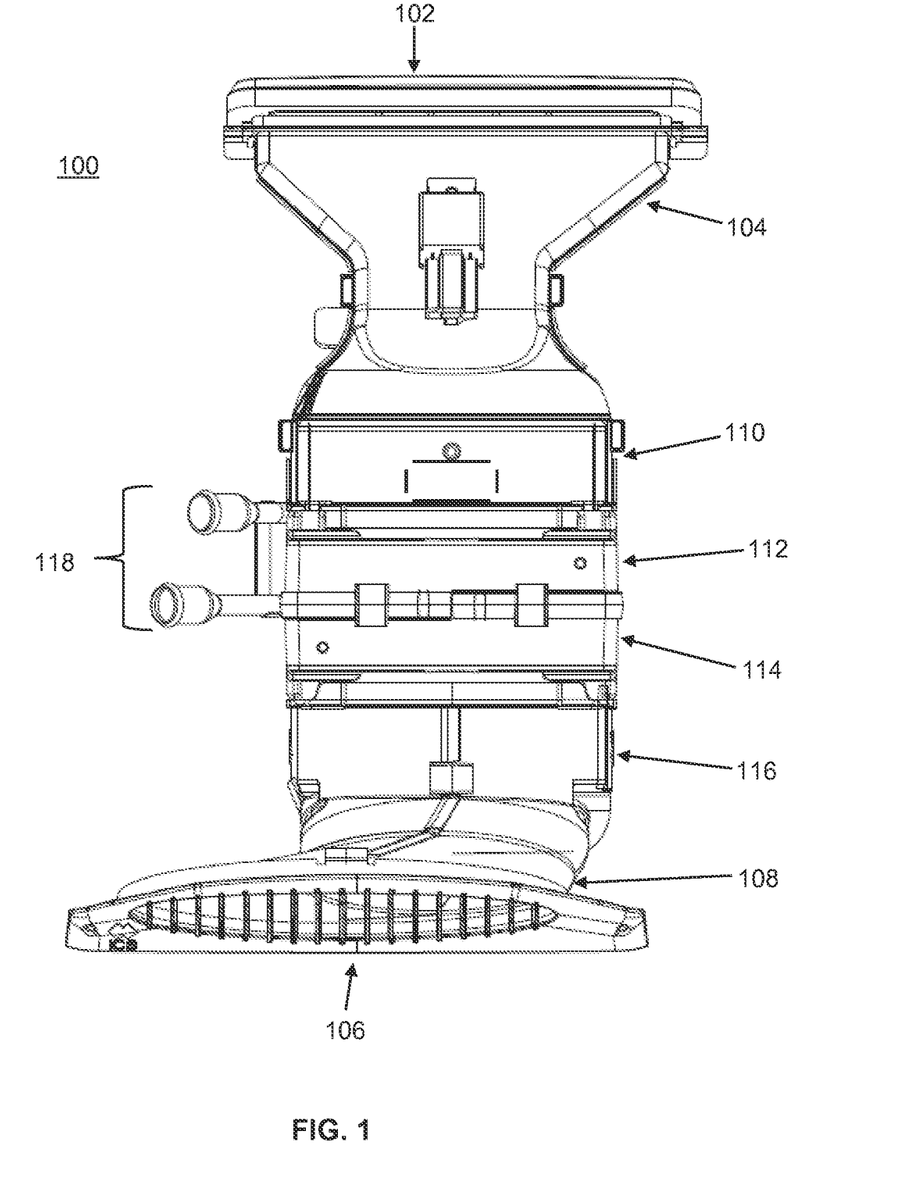
FIG. 1 is a front view of an embodiment of a dual fan design of the present disclosure.
Figure 2:
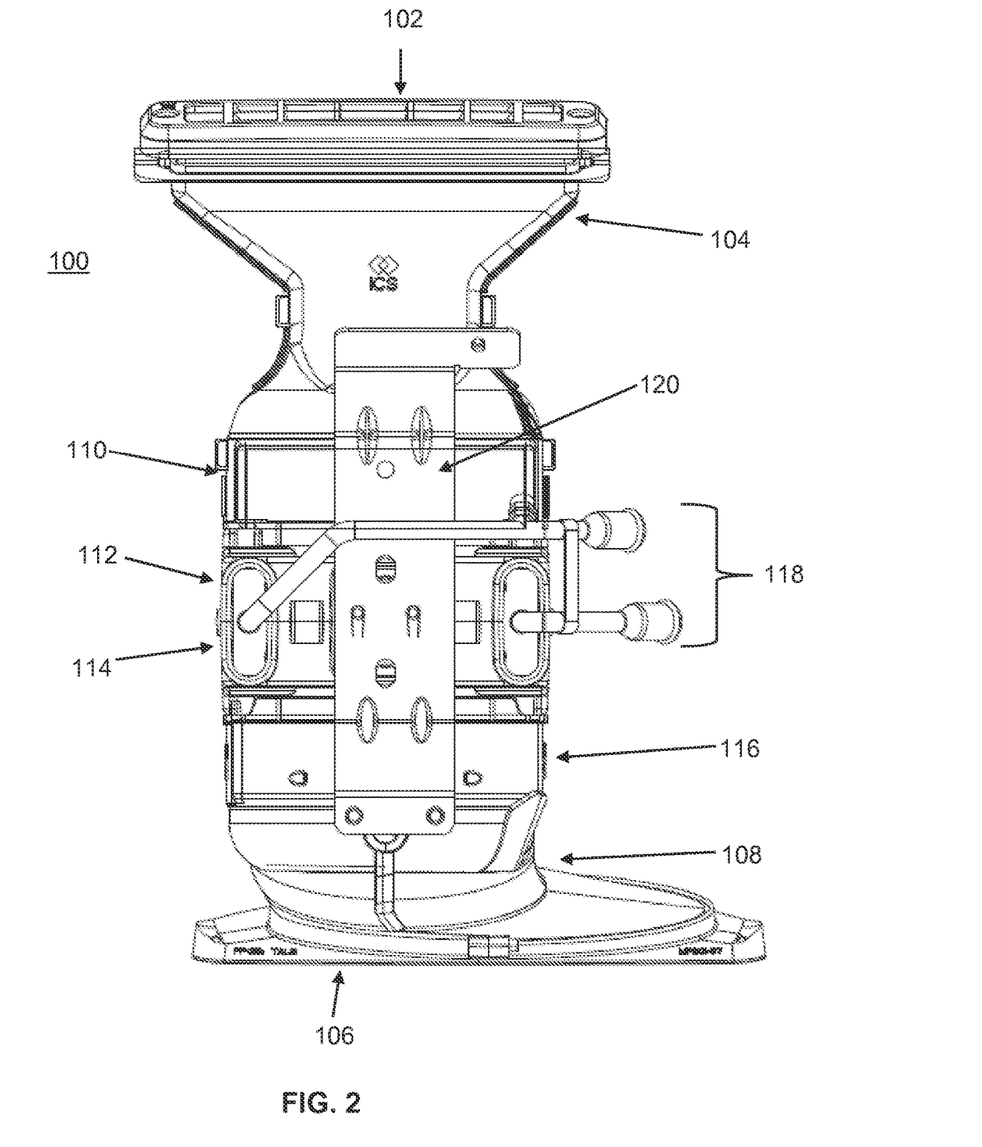
FIG. 2 is a back view of an embodiment of a dual fan design of the present disclosure.
Figure 3:
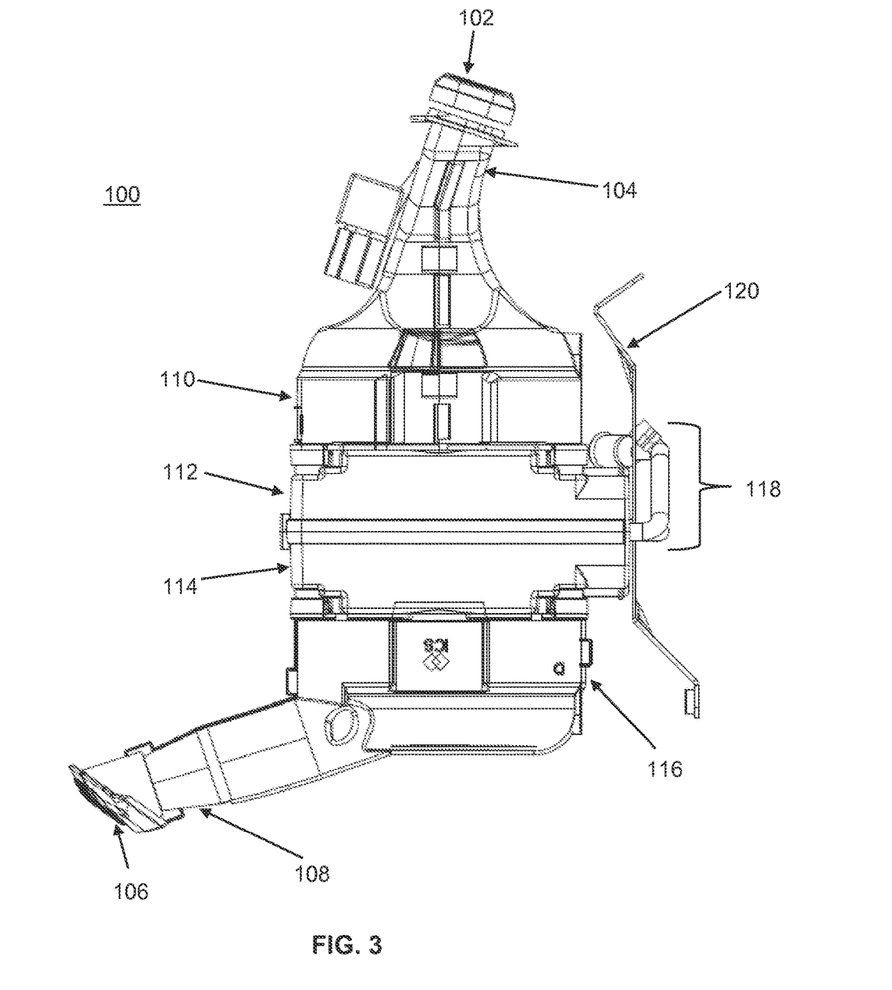
FIG. 3 is a side view of an embodiment of a dual fan design of the present disclosure.

FIGS. 1, 2 and 3 show a front view, a back view and a side view of an assembled embodiment of dual fan apparatus 100 for heating or cooling air. The orientation and view terms used herein are to provide reference for the discussion of the dual fan assembly and do not limit the disclosure. Accordingly, one skilled in the art will recognize that the dual fan apparatus 100 may be installed and/or viewed in any number of orientations and remain within the scope and spirit of the present application.

As discussed herein, the dual fan apparatus 100 is designed to facilitate heating and cooling operations and includes heating and cooling system elements. Some embodiments of the dual fan apparatus 100 are designed for only heating or cooling operations. The operation as either a heating system, cooling system or a combination system will depend on the thermal exchange component (shown in FIGS. 4 and 5) used within the dual fan apparatus 100.

The embodiment shown includes an air vent 102 attached to an air duct 104 at the top. Another air vent 106 is attached to an air duct 108 at the bottom of the dual fan apparatus 100 shown. In this embodiment, the air duct 104 is shown as part of the upper fan housing 110 and the air duct 108 is part of the lower fan housing 116. In some embodiments, the air ducts 104 and 108 may comprise a separate housing attached to the fan housings 110 and 116. In some embodiments, the air duct 104 and/or the air duct 108 may provide multiple separate air ports. In some embodiments, the air ports may be connectable to additional duct attachments which may be used to direct air to specific locations. For example, air duct 104 may include two air ports connected to flexible ducts that direct air to separate locations around the vehicle, such as one proximate to a driver seat and one proximate to a passenger seat.

In this embodiment, the dual fan apparatus 100 also includes an upper thermal exchange housing 112 and a lower thermal exchange housing 114. The upper thermal exchange housing 112 and lower thermal exchange housing 114 are designed to enclose a thermal exchange component (shown in FIGS. 4 and 5). In some embodiments, the thermal exchange housings 112 and 114 may comprise a single housing structure. In other embodiments, the upper thermal exchange housing 112 and the upper fan housing 110 may comprise a single housing and the lower thermal exchange housing 114 and the lower fan housing 116 may comprise a single housing. One skilled in the art will recognize that the housing structures may vary depending on the design requirements for an embodiment and remain within the scope of the disclosure.

In this embodiment, the upper fan housing 110, the upper thermal exchange housing 112, the lower thermal exchange housing 114 and the lower fan housing 116 are stacked along a single axis—illustrated as the vertical axis in the figures. The air duct 104 extends generally along the same vertical axis shown. In contrast, the air duct 108 extends at an angle that is nearly perpendicular from the vertical axis illustrated. Embodiments of the dual fan apparatus 100 may include air ducts 104 and 108 extending at any direction appropriate for the implementation. For example, both air ducts 104 and 108 may extend along the same axis as the main housing components. As another example, both air ducts 104 and 108 may extend at angles from the main axis in order to fit within a restricted space available for the dual fan apparatus 100.

The dual fan apparatus 100 also includes connectors 118 that are designed to connect with a heating and/or cooling fluid or gas source. For example, the connectors 118 may connect with a system pumping heated engine coolant through the thermal exchange component (shown in FIGS. 4 and 5) to operate as a heater. The system may be operable to reverse the flow of the coolant to pump cold coolant through the thermal exchange component to operate as an air conditioner. One skilled in the art will recognize that the type of fluid or gas may vary depending on the operational characteristics of the thermal exchange component and the dual fan apparatus 100. The term thermal agent is used herein to identify the fluid or gas used in the thermal exchange component 142.

The dual fan apparatus 100 also includes a mounting bracket 120 in this embodiment. As shown in FIGS. 2 and 3 the mounting bracket 120 is provided at the back of the dual fan apparatus 100 and may include features—such as the angular elements illustrated in FIG. 3—designed for specific mounting conditions. One skilled in the art will recognize that the placement and features of the mounting bracket 120 may vary to accommodate structural restrictions of the vehicle or other component in which the dual fan apparatus 100 is installed and remain within the scope and spirit of the disclosure. In some embodiments, the mounting bracket 120 is attached directly to one or more of the housing components 110, 112, 114 and 116. In some embodiments, the mounting bracket 120 may be attached directly to one of the internal components of the dual fan apparatus 100. In some embodiments, the mounting bracket 120 may incorporate adjustable features or attachments to allow one version of the dual fan apparatus 100 to be operable in a variety of enclosed spaces with different mounting characteristics. For example, the angles in the mounting bracket 120 shown in FIG. 3 may be adjustable to allow variable mounting angles. For another example, the mounting bracket 120 may include spacers to provide installation adjustments.

Figure 4:
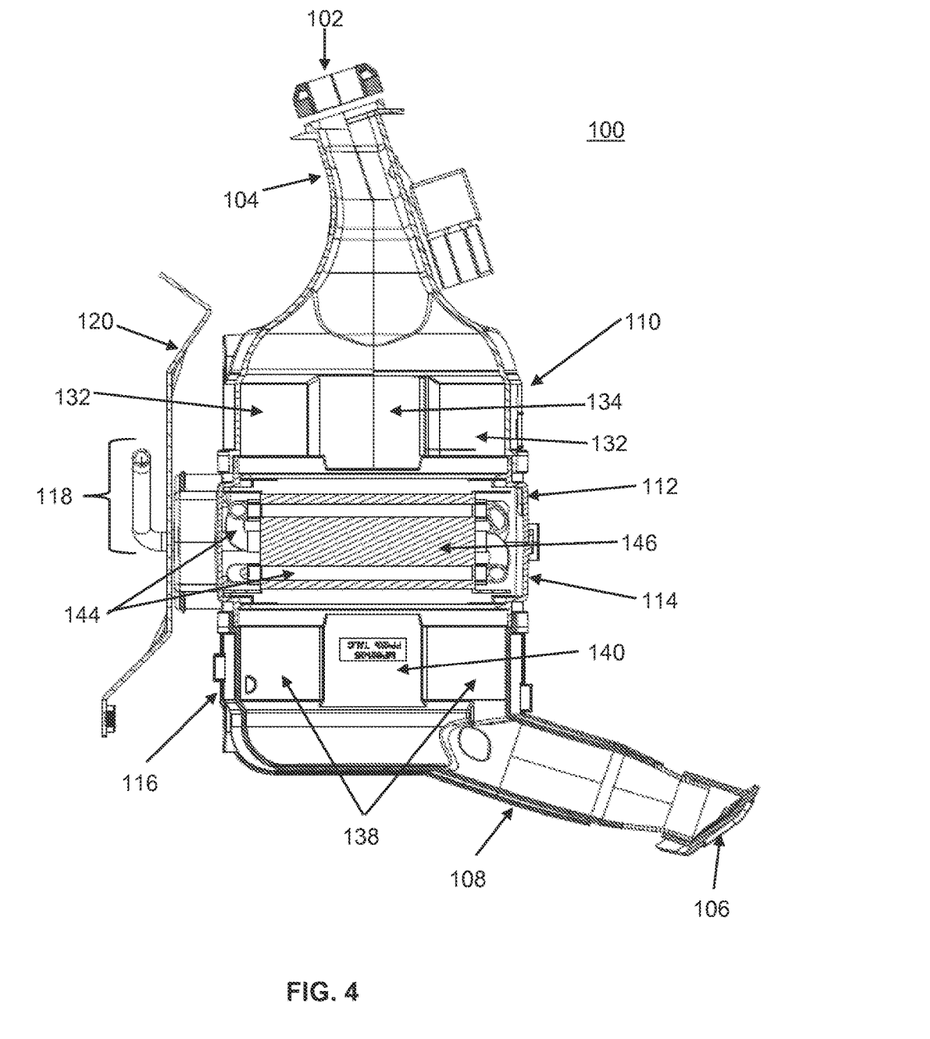
FIG. 4 is a cross-section side view of an embodiment of a dual fan design of the present disclosure.

FIG. 4 illustrates a cross-section view of the dual fan apparatus 100. As discussed above, the embodiment shown includes the upper fan housing 110, the upper thermal exchange housing 112, the lower thermal exchange housing 114 and the lower fan housing 116. The upper fan housing 110 includes the air duct 104 with the vent 102 attached thereto. The lower fan housing 116 includes the air duct 108 with the vent 106 attached thereto.

Figure 5:
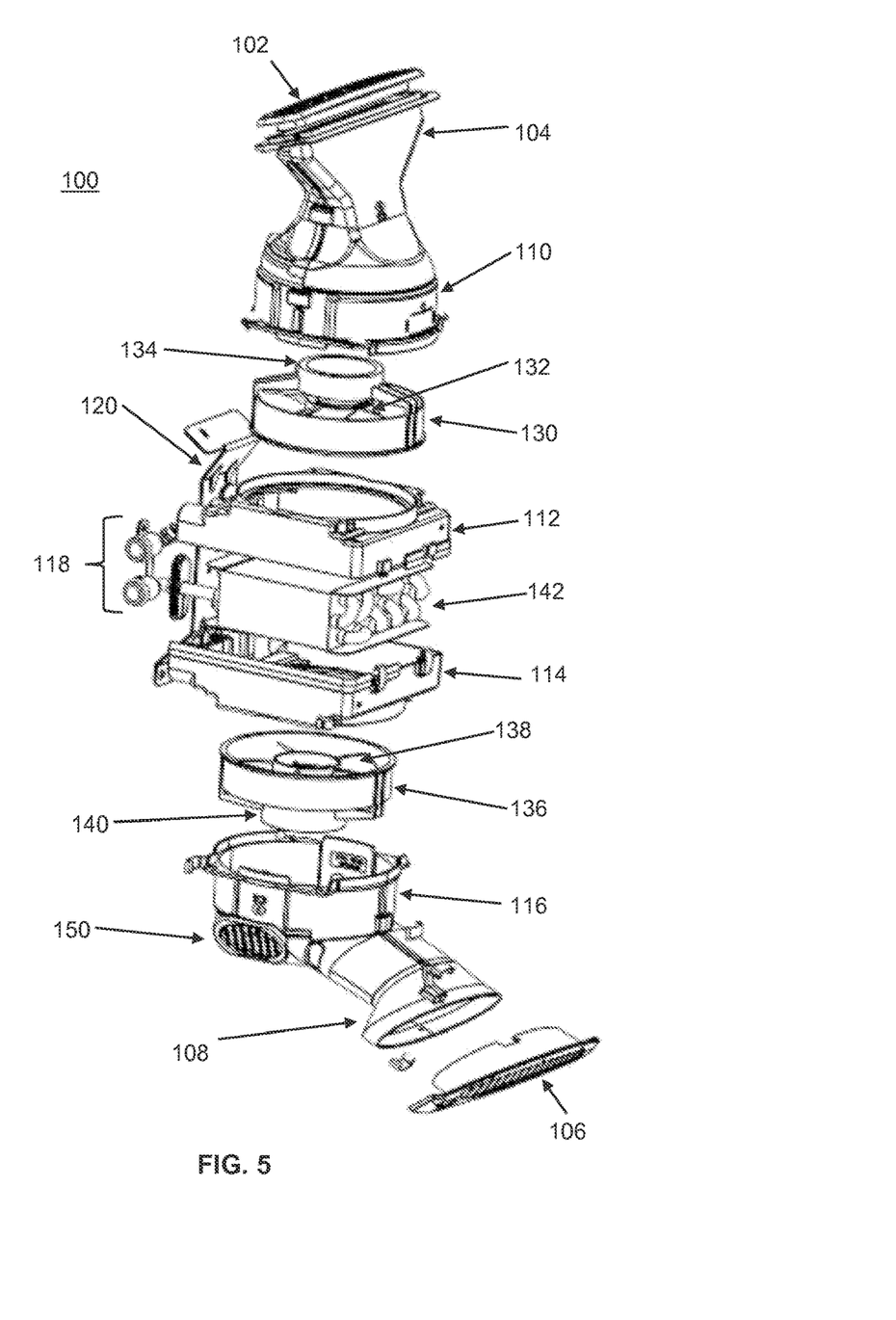
FIG. 5 is a perspective, exploded view of an embodiment of a dual fan design of the present disclosure.

The dual fan apparatus 100 includes an upper fan 130 and a lower fan 136 (shown in FIG. 5). The upper fan 130 includes fan blades 132 and fan motor 134 operable to turn the fan blades 132 in forward and reverse directions. The lower fan 136 includes fan blades 138 and fan motor 140 operable to turn the fan blades 138 in forward and reverse directions. The fan motors 134 and 140 are located in the center of the upper fan 130 and lower fan 136 respectively and each attach to the respective fan blades 132 and 138. The fan blades 132 and 138 are designed to rotate around the central fan motors 134 and 140. In some embodiments, the fan blades 132 and 138 are designed to include a central mounting socket attachable to a mounting rod extending from the fan motors 134 and 140. In some embodiments, the fan motor 143 and/or 140 may be extended along the vertical axis from the fan blades 132 and/or 138.

In this embodiment, the fans 130 and 136 are located in line with the thermal exchange component 142 (shown in FIG. 5). Axial fans using a central motor as illustrated in this embodiment facilitate the in line configuration with other components. The use of axial fans also allows the diameter of the fans 130 and 136 to extend to the edge of the interior edge of the dual fan apparatus 100 and correspond with the size of the thermal exchange component 142. In turn, the corresponding sizes between the fan and the thermal exchange component 142 maximize the airflow over the thermal exchange component 142. Accordingly, the in line configuration of the axial fans 130 and 136 and the thermal exchange component 142 allows the dual fan apparatus 100 to maintain a compact design with a high effective airflow across the thermal exchange component 142.

The thermal exchange component 142 may be a heating element (such as a heat exchanger, electric coil, heater core, etc.), a cooling element (such as an air conditioner evaporator) or a combination component comprising a heating element and a cooling element. The thermal exchange component 142 illustrated includes tubes 144 through which the thermal agent (i.e., heating and/or cooling fluid or gas) flows and fins 146 designed to increase the surface area for facilitating the thermal exchange from the thermal agent in tubes 144 to the air passing over the thermal exchange component 142. The increased surface area provided by the fins 146 increases the efficiency of the thermal transfer into the air. In some embodiments, multiple thermal exchange components 142 may be included in the dual fan apparatus 100.

FIG. 5 illustrates an exploded view of an embodiment of the dual fan apparatus 100. This view shows the various components that are assembled in to the dual fan apparatus 100. As discussed above, the dual fan apparatus 100 includes the vent 102 attached to the air duct 104 of the upper fan housing 110. One end of the upper fan housing 110 fits over the upper fan 130 when assembled. In some embodiments, the upper fan 130 is mounted to the upper fan housing 110. The upper fan 130 includes the fan motor 134 with fan blades 132 designed to rotate in either a forward or reverse direction around the fan motor 134. The upper fan 130 fits over the thermal exchange component 142 when assembled. In some embodiments, the upper fan 130 and/or the lower fan 136 are substantially parallel with the thermal exchange component 142. The fans 130 and 136 may be substantially parallel to ensure the majority of air is pushed directly onto the thermal exchange component 142 or pulled directly from the thermal exchange component 142.

The thermal exchange component 142 is enclosed within the upper thermal exchange housing 112 and the lower thermal exchange housing 114. The upper thermal exchange housing 112 includes an opening in the top to correspond with the upper fan 130. In some embodiments, the upper fan 130 may be mounted to the opening in the upper thermal exchange housing 112. The lower thermal exchange housing 114 includes an opening in the bottom to correspond with the lower fan 136. In some embodiments, the lower fan 136 may be mounted to the opening in the lower thermal exchange housing 114.

The thermal exchange component 142 also includes input/output tubes that terminate at connectors 118. The connectors 118 are designed to operably connect the thermal exchange component 142 to a system for heating and/or cooling a fluid or gas medium used by the thermal exchange component 142. The input/output tubes pass through an opening in the back of the dual fan apparatus 100 between the upper thermal exchange housing 112 and the lower thermal exchange housing 114.

In this embodiment, the mounting bracket 120 is attached to the back of the dual fan apparatus 100. The mounting bracket 120 may be attached to the thermal exchange housing components 112 and 114 in some embodiments. In other embodiments, the mounting bracket 120 may be attached to the thermal exchange component 142. In yet other embodiments, the mounting bracket 120 may be attached to a combination of components of the dual fan apparatus 100. For example, the mounting bracket 120 may be attached to the upper fan housing 110, the thermal exchange component 142 and the lower fan housing 116. One skilled in the art will recognize that the mounting bracket 120 may be attached to any of the components of the dual fan apparatus 100. In addition, some embodiments may include multiple mounting brackets 120 attached at different locations on the dual fan apparatus 120. The location, design and structure of the mounting brackets 120 may vary dependent upon the installation requirements. In some embodiment, a product package may include multiple mounting brackets 120 in order for a single product package to be applicable to multiple applications for installation.

The lower fan 136 includes the fan motor 140 with fan blades 138 designed to rotate in either a forward or reverse direction around the fan motor 140. The lower fan 136 fits under the thermal exchange component 142 when assembled. In some embodiments, the lower fan 136 is mounted to the lower fan housing 116 which fits over the lower fan 136 when the dual fan apparatus 100 is assembled. The lower fan housing 116 includes the air duct 108 extending at a near perpendicular angle from the main axis of the dual fan apparatus 100. The air port at the end of air duct 108 attaches to vent 106. In this embodiment, the lower fan housing 116 also includes a second air port with a vent 150 provided in the air port. This air port provides a separate air intake or exit from the lower fan housing 116.

Vent 106 is designed to fit with the air port at the end of the air duct 108. One skilled in the art will recognize that the vents are designed to fit with the respective air ports and may connect to the air port in a variety of manners. For example, the vent 106 may be configured to fit within the air port of duct 108 such that the vent 106 and air port create a friction connection between the components. The components may include alternative connection means to facilitate a fixed connection between the vent and the air port. For example, the components may be connected using adhesives, bolts, screws, clamps, latches and/or other connections. In some embodiments, the vents may be molded into or welded to the air ports.

The vents 102, 106 and 150 are designed to facilitate the airflow into and out of the dual fan apparatus 100. In some embodiments, the vents 102, 106 and 150 may be adjustable to allow a user to control the direction of the airflow. For example, the vents 102, 106 and 150 may include a control to direct the output of air towards the user. In some embodiments, some vents may be adjustable while other vents are not. For example, vent 102 may be adjustable while vents 106 and 150 are not adjustable. Some embodiments of the vents 102, 106 and 150 may prevent total occlusion of the associated air port.

When assembled, the external housing components 110, 112, 114 and 116 will be connected to form an apparatus housing that encases the internal components including the upper fan 130, thermal exchange component 142 and lower fan 136. The interior structure of the housing components 110, 112, 114 and 116 will be designed to hold the upper fan 130, thermal exchange component 142 and lower fan 136 in an operational configuration with the upper fan 130 and lower fan 136 located adjacent to opposite sides of the thermal exchange component 142. In some embodiments, the internal components may be held in place by pressures applied by the assembled external housing components. In alternative embodiments, the internal components may be attached to the external housing components through a fixed connection. For example, the upper fan 130 may be attached to the upper thermal exchange housing 112 by an adhesive connection and bolts. For another example, the lower fan 136 may be attached to the lower fan housing 116 by a snap connection.

In some embodiments, the connections between components and/or the mounting bracket 120 and the vehicle may incorporate gaskets or other paddings to limit vibration caused during operation of the dual fan apparatus 100 and/or the vehicle in which the dual fan apparatus 100 is installed.

In advance of operation, the dual fan apparatus 100 is installed in a vehicle or other environment. The dual fan apparatus 100 may be rotated in order to fit in a vehicle or other environment during installation. For example, vent 102 may be placed in a dashboard of a vehicle to operate as an upper air vent and the vent 106 may be designed to operate as a lower air vent for the feet. In another embodiment, the dual fan apparatus may be rotated such that the vent 102 may operate as a lower air vent for the feet and the vent 106 may operate as a defrost vent in the top of a vehicle dashboard. As discussed above, some embodiments may include additional air ports and air ducts to facilitate additional vent locations in a vehicle.

Once properly rotated and positioned, the dual fan apparatus 100 may be installed using one or more mounting brackets 120. In some embodiments, additional connection points between the dual fan apparatus 100 and the vehicle or other environment may be used during installation. For example, during installation in a vehicle, the air ports on air ducts 104 and 108 may abut openings in the vehicle dashboard and/or body, and the vents 102 and 106 may pass through the openings in the dashboard and/or body to engage and connect to air ducts 104 and 108 creating additional connections between the dual fan apparatus 100 and the vehicle.

Finally, a thermal modification system (i.e., a heating and/or cooling system) that circulates a thermal agent (i.e. a gas or fluid) is attached to the connections 118 of the thermal exchange component 142. One of the connections 118 operates as an input while the second connection 118 operates as an output to continue the circulation of the thermal agent through the external thermal modification system and back to the thermal exchange component 142. For example, a heated engine coolant may be circulated through a heating system whereby the heat from the engine coolant is transferred into the air via the thermal exchange component 142.

During operation of a combination heating and cooling apparatus, the external heating and cooling system will circulate a fluid or gas through the thermal exchange component 142 in a first direction. For example, the external heating and cooling system may pump heated engine coolant into the top connection 118 and through the thermal exchange component 142. While the heated engine coolant is passing through the tubes 144 of the thermal exchange component 142, the heat from the engine coolant transfers into cooler air passing through the thermal exchange component 142. Specifically, the heat transfer occurs from the engine coolant through the conductive material of the tubes 144 and the fans 146 attached to the tubes 144 into the passing air. The surface area of the fins 146 operates to increase the efficiency of the heat exchange. The transfer of heat into the air causes the engine coolant to reduce in temperature within the thermal exchange component 142. Accordingly, the coolant exits the thermal exchange component 142 and the lower connection 118 at a reduced temperature and continues to circulate through the external heating and cooling system wherein the fluid or gas becomes reheated and returns to the thermal exchange component 142. In some embodiments, the external heating aspect of the system may operate in different manners that pump heated gas or fluid through the thermal exchange component.

While the heated engine coolant is passing through the thermal exchange component 142, the upper fan 130 and lower fan 136 operate in conjunction to move air through the dual fan apparatus 100 and the thermal exchange component 142 in one direction. For example, the upper fan 130 may rotate blades 132 in a clockwise direction to pull air through the thermal exchange component 142 and push the air out of air duct 104 and vent 102 while the lower fan 136 may rotate blades 138 in a counter-clockwise direction to push air into the thermal exchange component 142 and pull air into the dual fan apparatus 100 through vent 150 and/or vent 106 via the air duct 108. The fan motors 134 and 140 may be reversed to move air through the dual fan apparatus 100 in the opposite direction. In some embodiment, the angle of the blades 132 or 138 may be reversed such that both fans 130 and 136 rotate in the same direction to move air through the dual fan apparatus 100 in the same direction.

The push-pull operation of the two fans 130 and 136 operates to improve the air speed through the dual fan apparatus 100 and the thermal transfer into the air. For example, when the air is moved through the dual fan apparatus 100 in the direction from vent 102 to vents 150 and/or 106, the fan 130 may push air into the area of the thermal exchange component 142 and the fan 136 may pull air from the area of the thermal exchange component 142. When operating to push the air, he design of the fan blades 132 may push more of the air to the edges of the fan 130. In contrast, the design of fan blades 138 may draw more air through the center of fan 136 when operating to pull the air from the thermal exchange component 142. In such an embodiment, the push-pull effects caused by the fans 130 and 136 cause more air to pass from the outer edges to the center of the thermal exchange component 142 increasing the efficiency of the thermal transfer. In contrast to the airflow created by the dual fan apparatus 100, a single fan would not operate to provide the uniform airflow across the entirety of a heat exchange.

When the dual fan apparatus 100 is used as part of a cooling system, the direction of the fluid or gas passing through the tubes 144 of the thermal exchange component 142 may be reversed. Accordingly, the cooled fluid or gas may be pumped from a compressor into the lower connection 118 into the thermal exchange component 142. The thermal exchange component 142 may act as an evaporator to cool the air passing through the dual fan apparatus 100. The fluid or gas may exit the thermal exchange component 142 at an increased temperature and continue to circulate through the external cooling system elements until returning to the thermal exchange component 142.

In some embodiments, the external heating system and external cooling system are integrated such that the direction in which the gas or fluid passes dictates whether the thermal exchange component 142 operates as a heating or cooling exchange. In some embodiments, the external heating system and external cooling system are separate systems tied into tubing connected to the connections 118 at a controlled junction. The junction operates to control whether the heating system or cooling system is actively associated with the dual fan apparatus 100. In some embodiments, the external heating and/or cooling system may operate utilizing gas-to-fluid and fluid-to-gas transitions to create the thermal differences used in the thermal exchange component 142.

Embodiments of the dual fan apparatus 100 include an operably associated user interface to control the operation of the dual fan apparatus 100. For example, the user interface allows a user to control the direction of airflow, speed of the airflow and/or temperature of the airflow. The user interface may include electronic and/or mechanical switches.

During operation, the vents 102, 150 and/or 106 may be controlled by a user to direct airflow into and/or out of the dual fan apparatus 100. For example, a user may tilt the vent 102 to direct heated air toward a user's legs during cold weather. A user may later angle the vent 106 to direct cooled air in the center of a vehicle cabin. In some embodiments, the functions of the dual fan apparatus 100 may affect the operation of the vents 102, 106 and 150. For example, the vents 106 and 150 may be open as the air is directed out vent 102 to maintain maximum airflow into the dual fan apparatus 100. When the airflow is reversed, the vent 150 may automatically close in order to direct the maximum airflow out of vent 106. In some embodiments, the vents 102, 106 and/or 150 may include elements to prevent occlusion of the vent and ensure airflow into the dual fan apparatus 100 is not cut off. In some embodiments, additional air ports may be built into the dual fan apparatus 100 to ensure the availability of air on the intake side of the dual fan apparatus 100.

Figure 6:
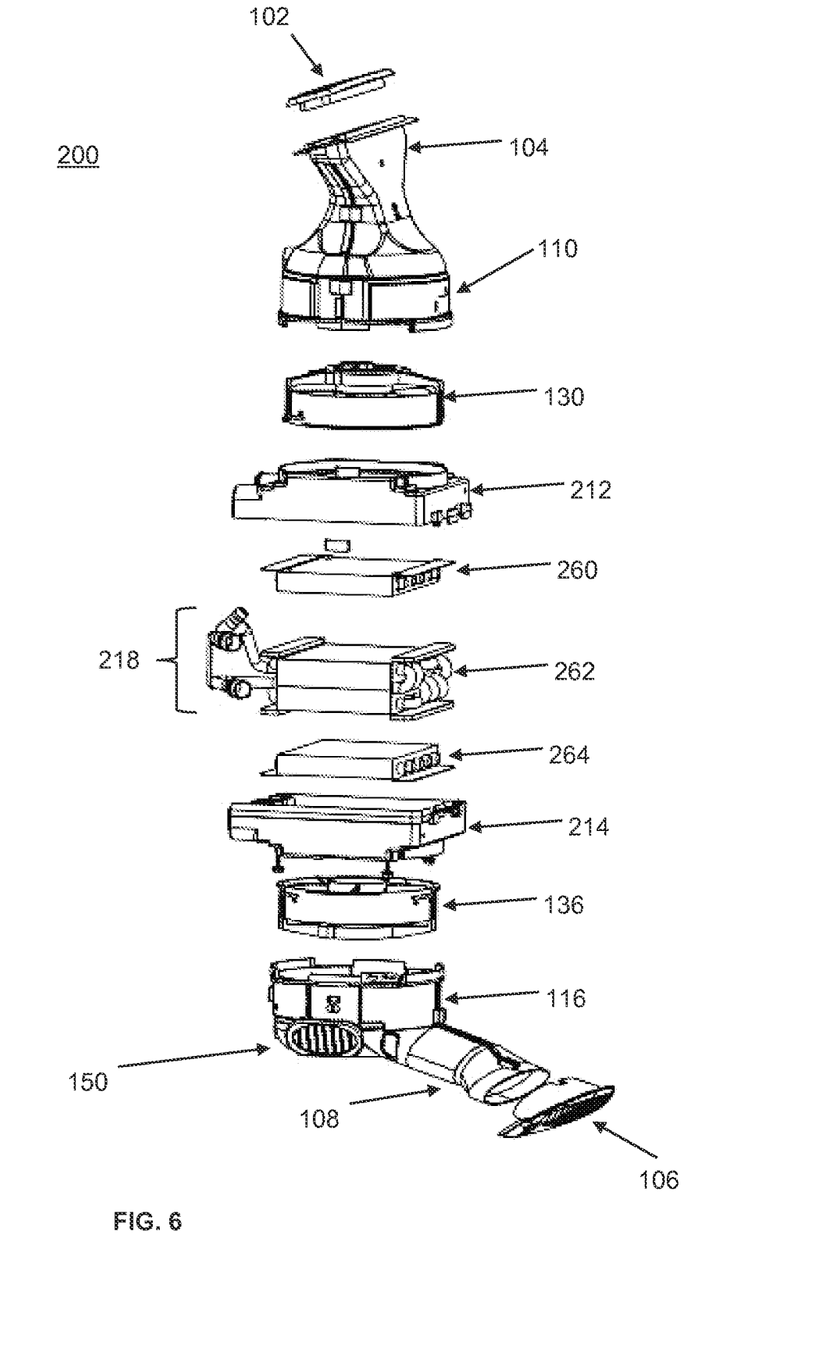
FIG. 6 is a perspective, exploded view of another embodiment of a dual fan design of the present disclosure.

FIG. 6 illustrates an exploded view of another embodiment of a dual fan apparatus 200. This view shows the various components that are assembled in to the dual fan apparatus 200. Although the housing components and the fans are similar to the design disclosed above, this embodiment illustrates an alternative configuration of the thermal exchange system. As discussed further below, the thermal exchange component 142 described above is replaced with the series of thermal exchange components 260, 262 and 264 in the embodiment shown in FIG. 6.

Similar to the embodiment discussed above, the dual fan apparatus 200 includes the vent 102 attached to the air duct 104 of the upper fan housing 110. One end of the upper fan housing 110 fits over the upper fan 130 when assembled. The upper fan 130 is designed to rotate in either a forward or reverse direction. The lower fan 136 is also designed to rotate in either a forward or reverse direction. The lower fan housing 116 which fits over the lower fan 136 when the dual fan apparatus 200 is assembled. The lower fan housing 116 includes the air duct 108 extending at a near perpendicular angle from the main axis of the dual fan apparatus 200. The air port at the end of air duct 108 attaches to vent 106. In this embodiment, the lower fan housing 116 also includes a second air port with a vent 150 provided in the air port. This air port provides a separate air intake or exit from the lower fan housing 116.

The vents 102, 106 and 150 are designed to facilitate the airflow into and out of the dual fan apparatus 200. In some embodiments, the vents 102, 106 and 150 may be adjustable to allow a user to control the direction of the airflow. For example, the vents 102, 106 and 150 may include a control to direct the output of air towards the user. Some embodiments of the vents 102, 106 and 150 may prevent total occlusion of the associated air port.

The thermal exchange components in this embodiment include upper heater core 260, evaporator 262 and lower heater core 264. The upper and lower heater cores 260 and 264 are designed to heat the air passing through the dual fan apparatus 200.

The heater cores 260 and 264 may be an engine coolant heat exchange unit, an electric heat exchange unit or any other type of heating element. In addition, the upper heater core 260 and the lower heater core 264 may be the same type of heating element or may be different types of heating elements. The evaporator 262 in this embodiment operates as a cooling element and cools air passing through the evaporator 262. In some embodiments, the evaporator 262 may be replaced with an alternative cooling element or device. In some embodiments, the thermal exchange components—i.e. the upper heater core 260, the evaporator 262 and the lower heater core 264—are slim frame designs to minimize the necessary space for the components.

The thermal exchange components—i.e. the upper heater core 260, the evaporator 262 and the lower heater core 264—are enclosed within the upper thermal exchange housing 212 and the lower thermal exchange housing 214. The upper thermal exchange housing 212 includes an opening in the top to correspond with the upper fan 130. The lower thermal exchange housing 214 includes an opening in the bottom to correspond with the lower fan 136.

In this embodiment, the evaporator 262 also includes input/output tubes that terminate at connectors 218. The connectors 218 are designed to operably connect the evaporator 262 to a system for cooling a fluid or gas medium used by the evaporator 262. The input/output tubes pass through an opening in the back of the dual fan apparatus 200 between the upper thermal exchange housing 212 and the lower thermal exchange housing 214.

In this embodiment, one or more housing components of the dual fan apparatus 200 are designed to facilitate mounting of the dual fan apparatus 200 in a vehicle or another limited space environment. As discussed above, one or more mounting brackets may be attached to the dual fan apparatus 200 to coordinate specific mounting configurations.

When assembled, the upper fan 130 fits over the upper heater core 260 and the lower fan 136 fits under the lower heater core 264. In some embodiments, the upper fan 130 and/or the lower fan 136 are substantially parallel with the upper heater core 260, the evaporator 262 and/or the lower heater core 264. The fans 130 and 136 may be substantially parallel to ensure the majority of air is pushed directly onto the thermal exchange components 260, 262 and 264 or pulled directly from the thermal exchange components 260, 262 and 264.

When assembled, the external housing components 110, 212, 214 and 116 will be connected to form an apparatus housing that encases the internal components including the upper fan 130, the upper heater core 260, the evaporator 262, the lower heater core 264 and the lower fan 136. The interior structure of the housing components 110, 212, 214 and 116 will be designed to hold the upper fan 130, the upper heater core 260, the evaporator 262, the lower heater core 264 and the lower fan 136 in an operational configuration. The upper and lower heater cores 260 and 264 are designed to sandwich the evaporator 262 in line with the upper and lower fans 130 and 136 which are located on opposite sides of the sandwiched thermal exchange components. Accordingly, the configuration of housing components 110, 212, 214 and 116 will hold the upper fan 130 adjacent to the upper heater core 260 and lower fan 136 adjacent to the lower heater core 264 on opposite sides of the sandwiched thermal exchange components. In some embodiments, the internal components may be held in place by pressures applied by the assembled external housing components 110, 212, 214 and 116. In alternative embodiments, the internal components may be attached to the external housing components though a fixed connection.

In advance of operation, the dual fan apparatus 200 is installed in a vehicle or other environment. The dual fan apparatus 200 may be rotated in order to fit in a vehicle or other environment during installation. As discussed above, some embodiments may include additional air ports and air ducts to facilitate additional vent locations in a vehicle. Once properly rotated and positioned, the dual fan apparatus 200 may be installed using one or more mounting components. Finally, a cooling system that circulates a thermal agent (i.e. a gas or fluid) is attached to the connections 218 of the evaporator 262. One of the connections 218 operates as an input while the second connection 218 operates as an output to continue the circulation of the thermal agent through the cooling system and back to the evaporator 262.

During operation of the dual fan apparatus 200 for heating, either one or both of the upper heater core 260 and the lower heater core 264 may be engaged to heat the air passing through the dual fan apparatus. For example, only the upper heater core 260 may be on when air is moving through the dual fan apparatus 200 in an upward direction. Alternatively, only the lower heater core 264 may be on when air is moving through the dual fan apparatus 200 in a downward direction. In some embodiments, both heater cores 260 and 264 may be engaged to increase the air temperature more than either heater core 260 or 264 can heat the air alone.

During operation of the dual fan apparatus 200 with the evaporator 262 engaged, the external cooling system will circulate a fluid or gas through the evaporator 262. Cooled fluid or gas may be pumped from a compressor into the input connection 218 into the evaporator 262 to cool the air passing through the dual fan apparatus 200. The fluid or gas may exit the evaporator 262 at an increased temperature and continue to circulate through the external cooling system elements until returning to the evaporator 262. When the evaporator 262 is engaged, the air is conditioned and cooled as it passes through the evaporator 262. In some embodiments, the evaporator 262 may be engaged when the dual fan apparatus 200 is used for cooling and/or heating air. In some embodiments, the evaporator 262 may be used for cooling and heating the air up to a threshold temperature at which the evaporator 262 is shut off to facilitate increased heating of the air.

During operation of the dual fan apparatus 200, the operation of each of the upper heater core 260, the evaporator 262 and the lower heater core 264 is coordinated to provide desired air conditioning and thermal modification. For example, when the air is moving from the air duct 104 towards the air duct 108, the upper hearer core 260 may be turned off while the evaporator 262 and the lower heater core 264 are engaged to condition the air and heat the outgoing air. For another example, the evaporator 262 may be shut off while both heater cores 260 and 264 are engaged to facilitate an increased air temperature flowing through the dual fan apparatus 200. In addition, one or more of the thermal exchange components 260, 262 and 264 may include an independent adjustment to modify the thermal output through the component.

While the dual fan apparatus 200 is operating, the upper fan 130 and lower fan 136 operate in conjunction to move air through the dual fan apparatus 200 and the thermal exchange components 260, 262 and 264 in one direction. For example, the upper fan 130 may rotate blades in a clockwise direction to pull air through the thermal exchange components 260, 262 and 264 and push the air out of air duct 104 and vent 102 while the lower fan 136 may rotate blades in a counter-clockwise direction to push air into the thermal exchange components 260, 262 and 264 and pull air into the dual fan apparatus 200 through vent 150 and/or vent 106 via the air duct 108. The fan motors may be reversed to move air through the dual fan apparatus 200 in the opposite direction.

The push-pull operation of the two fans 130 and 136 operates to improve the air speed through the dual fan apparatus 200 and the thermal transfer into the air. For example, when the air is moved through the dual fan apparatus 200 in the direction from vent 102 to vents 150 and/or 106, the fan 130 may push air into the area of the thermal exchange components 260, 262 and 264 and the fan 136 may pull air from the area of the thermal exchange components 260, 262 and 264.

Embodiments of the dual fan apparatus 200 include an operably associated user interface to control the operation of the dual fan apparatus 200. For example, the user interface allows a user to control the direction of airflow, speed of the airflow and/or temperature of the airflow. The user interface may include electronic and/or mechanical switches. For example, the user interface may control a water valve to modify the temperature output.

The invention being thus described and further described in the claims, it will be obvious that the same may be varied in many ways. Such variations are not to be regarded as a departure from the spirit and scope of the invention and all such modifications as would be obvious to one skilled in the art are intended to be included within the scope of the apparatus described.

The invention claimed is:
1. A dual fan apparatus comprising:
a thermal exchange component having a first side and a second side opposite from the first side;
a first axial fan adjacent to the first side of the thermal exchange component, wherein said first axial fan comprises a first fan blade that rotates around a central axis, and wherein an opposite side of the first axial fan from the thermal exchange component is fluidly connected to a first air port;
a second axial fan adjacent to the second side of the thermal exchange component, wherein said second axial fan comprises a second fan blade that rotates around said central axis, and wherein an opposite side of the second axial fan from the thermal exchange component is fluidly connected to a second air port, and wherein said first axial fan, a central area of said thermal exchange component and said second axial fan are in an in-line configuration;
wherein said first axial fan and said second axial fan are reversible and operable to move air through said dual fan apparatus from said first air port to said second air port and from said second air port to said first air port, and wherein said thermal exchange component modifies temperature of the air as the air passes through the thermal exchange component;
a housing encasing the first axial fan, the thermal exchange component and the second axial fan, wherein the housing comprises a first air duct extending from the first axial fan to the first air port, wherein the first air duct comprises a first air port end proximate to the first air port and a first air duct intermediate section between a first housing section and the first air port end, wherein the first housing section is adjacent to the first axial fan, and a subsection of the first air duct intermediate section is narrower than the first housing section, and a second air duct extending from the second axial fan to the second air port, wherein the second air duct comprises a second air port end proximate to the second air port and a second air duct intermediate section between a second housing section and the second air port end, wherein the second housing section is adjacent to the second axial fan, and a subsection of the second air duct intermediate section is narrower than the second housing section, and wherein a portion of said first housing section and a portion of said second housing section are in said in-line configuration;
wherein said dual fan apparatus is mounted in a dashboard of a vehicle and configured to modify a temperature inside the vehicle; wherein a portion of said second air duct extends at an angle from said central axis; and
wherein said first air duct is configured to connect to a vent in an opening in the dashboard.

2. The dual fan apparatus according to claim 1, wherein said thermal exchange component is a heating component.

3. The dual fan apparatus according to claim 1, wherein said thermal exchange component is a cooling component.

4. The dual fan apparatus according to claim 1, wherein said thermal exchange component is a heating and cooling component.

5. The dual fan apparatus according to claim 1, wherein said thermal exchange component comprises a first heater core, a second heater core and an evaporator located between said first heater core and said second heater core.

6. The dual fan apparatus according to claim 1, wherein said first axial fan rotates in a first rotational direction pushing the air to the thermal exchange component and said second axial fan rotates in a second rotational direction pulling the air from the thermal exchange component.

7. The dual fan apparatus according to claim 1, further comprising a mounting bracket.

8. The dual fan apparatus according to claim 1, wherein said thermal exchange component comprises tubes, which direct flow of a thermal agent through the thermal exchange component.

9. The dual fan apparatus according to claim 8, wherein said thermal exchange component comprises fins attached to said tubes, wherein said fins increase thermal transfer surface area within the thermal exchange component.

10. The dual fan apparatus according to claim 9, wherein said tubes extend to connectors, which facilitate a connection to a source of the thermal agent.

11. The dual fan apparatus according to claim 1, wherein said vehicle comprises at least one of a car, a truck, a tractor, an all-terrain vehicle, a golf cart and a boat.

12. The dual fan apparatus according to claim 1, further comprising a user interface, which facilitates control of at least one of an airflow direction through said dual fan apparatus, an air speed through said dual fan apparatus and a temperature of said thermal exchange component.

13. A dual fan apparatus comprising:
   an apparatus housing comprising:
      an upper fan housing section with a first air duct extending from a first end of said upper fan housing section to a first air port fitted with a first vent, wherein the first air duct comprises a first intermediate section between the first end of said upper fan housing section and the first air port, and wherein a subsection of the first intermediate section is narrower than the first end of said upper fan housing section,
      a lower fan housing section with a second air duct extending from a first end of said lower fan housing section to a second air port fitted with a second vent, wherein the second air duct comprises a second intermediate section between the first end of said lower fan housing section and the second air port, and wherein a subsection of the second intermediate section is narrower than the first end of said lower fan housing section, and
      a thermal exchange housing section located between the upper fan housing section and the lower fan housing section,
      wherein said first air port and said second air port open into a passenger cabin of a vehicle, and wherein at least one of said first vent or said second vent are configured to pass through an opening in a dashboard of the vehicle, and
      wherein said upper fan housing section, said lower fan housing section and said thermal exchange housing section are capable of being separated;
   a thermal exchange component encased within said thermal exchange housing section having a first side and a second side opposite from the first side;
   an upper axial fan encased within said first end of said upper fan housing section and adjacent to the first side of the thermal exchange component, wherein said thermal exchange housing section has a first opening corresponding with said upper axial fan, and wherein said first air duct is between said upper axial fan and said first air port;
   a lower axial fan encased within said first end of said lower fan housing section and adjacent to the second side of the thermal exchange component, wherein said thermal exchange housing section has a second opening corresponding with said lower axial fan, and wherein said second air duct is between said lower axial fan and said second air port;
   wherein said upper axial fan, said thermal exchange component, said lower axial fan, a portion of said upper fan housing section and a portion of said lower fan housing section are aligned, wherein a central axis passes proximate to a center of each of said upper axial fan, said thermal exchange component, said lower axial fan, said portion of said upper fan housing section and said portion of said lower fan housing section;
   wherein an exterior of said apparatus housing comprises an exterior of said upper fan housing section, an exterior of said lower fan housing section, and an exterior of said thermal exchange housing section; and
   wherein said upper axial fan and said lower axial fan operate in coordination to move air through said apparatus housing from said first air port through said thermal exchange component to said second air port, and wherein said thermal exchange component modifies temperature of the air as the air passes through the thermal exchange component,
   wherein a portion of said second air duct extends at an angle from said central axis, and
   wherein said dual fan apparatus is configured to modify a temperature inside the passenger cabin of the vehicle.

14. The dual fan apparatus according to claim 13, wherein said upper axial fan and said lower axial fan are reversible and are operable to move said air from said second air port through said thermal exchange component to said first air port.

15. The dual fan apparatus according to claim 13, comprising a mounting bracket to facilitate installation of said dual fan apparatus in said vehicle, wherein said dual fan apparatus is operable in a plurality of installation positions.

16. The dual fan apparatus according to claim 13, wherein said thermal exchange component is a heating component.

17. The dual fan apparatus according to claim 13, wherein said thermal exchange component is a cooling component.

18. The dual fan apparatus according to claim 13, wherein said thermal exchange component is a heating and cooling component.

19. The dual fan apparatus according to claim 13, wherein said thermal exchange component comprises a first heater core, a second heater core and an evaporator located between said first heater core and said second heater core.

20. The dual fan apparatus according to claim 13, wherein said upper axial fan rotates in a first direction pushing the air to the thermal exchange component and said lower axial fan rotates in a second direction pulling the air from the thermal exchange component.

21. The dual fan apparatus according to claim 13, wherein said thermal exchange component comprises tubes, which direct flow of a thermal agent through the thermal exchange component.

22. The dual fan apparatus according to claim 21, wherein said thermal exchange component comprises fins attached to said tubes, wherein said fins increase thermal transfer surface area within the thermal exchange component.

23. The dual fan apparatus according to claim 21, wherein said tubes extend to connectors which facilitate a connection to a source of the thermal agent.

24. The dual fan apparatus according to claim 13, wherein said dual fan apparatus is mounted in the dashboard of said vehicle.

25. The dual fan apparatus according to claim 23, wherein said vehicle comprises at least one of a car, a truck, a tractor, an all-terrain vehicle, a golf cart and a boat.

26. The dual fan apparatus according to claim 13, further comprising a user interface, which facilitates control of at least one of an airflow direction through said dual fan apparatus, an air speed through said dual fan apparatus and a temperature of said thermal exchange component.

27. A dual fan apparatus comprising:
- a thermal exchange component having a first side and a second side opposite from the first side, wherein said thermal exchange component comprises a first heater core, a second heater core and an evaporator sandwiched between said first heater core and said second heater core;
- a first axial fan adjacent to the first side of the thermal exchange component, wherein an opposite side of the first axial fan from the thermal exchange component is fluidly connected to a first air port;
- a second axial fan adjacent to the second side of the thermal exchange component, wherein an opposite side of the second axial fan from the thermal exchange component is fluidly connected to a second air port, and wherein said first axial fan, a central portion of said thermal exchange component and said second axial fan are in an in-line configuration;
- wherein said first air port and said second air port open into a passenger cabin of a vehicle;
- a housing encasing the first axial fan, the thermal exchange component and the second axial fan, wherein the housing comprises a first air duct between a first housing section and the first air port, wherein the first housing section is adjacent to the first axial fan, and a second air duct between a second housing section and the second air port, wherein the second housing section is adjacent to the second axial fan, and wherein a portion of said first housing section and a portion of said second housing section are in said in-line configuration, wherein the first air duct includes a first intermediate section between the first housing section and the first air port, and wherein a subsection of the first intermediate section is narrower than the first housing section, and wherein the second air duct includes a second intermediate section between the second housing section and the second air port, and wherein a subsection of the second intermediate section is narrower than the second housing section; and
- wherein said first axial fan and said second axial fan are reversible and operable to move air through said dual fan apparatus from said first air port to said second air port and from said second air port to said first air port, and wherein said thermal exchange component modifies temperature of the air as the air passes through the thermal exchange component,
- wherein said first air duct is configured to connect to a vent in an opening in a dashboard of the vehicle, wherein a portion of said second air duct extends at an angle from said in-line configuration, and
- wherein said dual fan apparatus is configured to modify a temperature inside the passenger cabin of the vehicle.

* * * * *

UNITED STATES PATENT AND TRADEMARK OFFICE
CERTIFICATE OF CORRECTION

PATENT NO. : 10,352,621 B2
APPLICATION NO. : 14/846427
DATED : July 16, 2019
INVENTOR(S) : Stephen William O'Brien Page 1 of 1

It is certified that error appears in the above-identified patent and that said Letters Patent is hereby corrected as shown below:

In the Specification

Column 4, Line 23: delete "143" and insert --134--

Column 4, Line 57: delete "in to" and insert --into--

Column 5, Line 3: delete "onto" and insert --into--

Column 5, Line 41: delete "apparatus 120" and insert --apparatus 100--

Column 5, Lines 43-44: delete "embodiment" and insert --embodiments--

Column 7, Line 25: delete "fans 146" and insert --fins 146--

Column 7, Line 38: insert --142-- after "component"

Column 7, Line 52: delete "embodiment" and insert --embodiments--

Column 7, Line 64: delete "he design" and insert --the design--

Column 8, Line 48: insert --of-- between "directed out" and "vent"

Column 8, Line 60: delete "in to" and insert --into--

Column 9, Line 8: delete "which"

Column 10, Line 4: delete "onto" and insert --into--

Column 10, Line 29: delete "though" and insert --through--

Signed and Sealed this
Eighth Day of October, 2019

Andrei Iancu
*Director of the United States Patent and Trademark Office*